US009215778B2

(12) United States Patent
Amarin et al.

(10) Patent No.: US 9,215,778 B2
(45) Date of Patent: Dec. 15, 2015

(54) DISTRIBUTED STREET LIGHTS MONITORING, COMMAND AND CONTROL COMBINED WITH SOLAR PHOTO VOLTAIC CELL

(71) Applicant: Petra Solar, Inc., South Plainfield, NJ (US)

(72) Inventors: Ruba Akram Amarin, Piscataway, NJ (US); Nasser Kutkut, Orlando, FL (US)

(73) Assignee: Petra Solar, Inc., South Plainfield, NJ (US)

( * ) Notice: Subject to any disclaimer, the term of this patent is extended or adjusted under 35 U.S.C. 154(b) by 13 days.

(21) Appl. No.: 14/059,895

(22) Filed: Oct. 22, 2013

(65) Prior Publication Data

US 2014/0111098 A1    Apr. 24, 2014

Related U.S. Application Data

(60) Provisional application No. 61/716,659, filed on Oct. 22, 2012.

(51) Int. Cl.
*H05B 37/02* (2006.01)
*H05B 37/03* (2006.01)

(52) U.S. Cl.
CPC ............ *H05B 37/02* (2013.01); *H05B 37/0272* (2013.01); *H05B 37/034* (2013.01); *Y02B 20/72* (2013.01)

(58) Field of Classification Search
CPC ............ H05B 33/0869; F21V 23/0442; G05B 11/017; F21S 13/10; F21S 8/085
USPC .......... 315/149–152; 362/145, 183; 320/DIG. 36, 101; 136/206
See application file for complete search history.

(56) References Cited

U.S. PATENT DOCUMENTS

| | | | |
|---|---|---|---|
| 6,393,381 B1 | 5/2002 | Williams et al. | |
| 7,976,180 B1 * | 7/2011 | Haun | F21S 8/086 362/153.1 |
| 8,044,539 B2 * | 10/2011 | Pan | H02J 7/35 307/71 |
| 8,066,399 B2 | 11/2011 | Yu et al. | |
| 8,096,673 B2 * | 1/2012 | Kuo | H05B 33/0809 320/101 |
| 8,106,593 B2 * | 1/2012 | Nevins | F03D 9/007 315/149 |
| 8,475,002 B2 * | 7/2013 | Maxik | F21S 2/00 362/157 |
| 2002/0176248 A1 * | 11/2002 | Wismeth | F21S 9/037 362/159 |
| 2008/0298051 A1 * | 12/2008 | Chu | F21S 8/086 362/183 |
| 2009/0040750 A1 * | 2/2009 | Myer | F21S 8/083 362/183 |
| 2009/0164174 A1 * | 6/2009 | Bears | G01D 4/00 702/188 |
| 2010/0029268 A1 * | 2/2010 | Myer | F21S 2/00 455/426.1 |
| 2010/0219762 A1 * | 9/2010 | Brumels | F21S 8/086 315/158 |
| 2010/0302765 A1 * | 12/2010 | Yu | F21S 8/081 362/183 |
| 2010/0318297 A1 | 12/2010 | Herzig et al. | |
| 2011/0001626 A1 * | 1/2011 | Yip | H05B 37/0263 340/635 |

(Continued)

OTHER PUBLICATIONS

International Search Report dated Jan. 17, 2014 Application No. PCT/US13/66031, 17 pgs.

*Primary Examiner* — Jason M Crawford

(74) *Attorney, Agent, or Firm* — Merchant & Gould P.C.

(57) ABSTRACT

Monitoring, command, control, and management of a street light may be provided. First, an amount of light may be determined. Next, a status of the street light may be determined based on the determined amount of light. Then, a current status of the street light may be determined. The current status may be compared with the determined status. Based on the comparison, the current status of the street light may be altered.

15 Claims, 6 Drawing Sheets

(56) References Cited

U.S. PATENT DOCUMENTS

| | | | | |
|---|---|---|---|---|
| 2011/0170283 A1* | 7/2011 | Chan | ............... | H05B 37/00 362/183 |
| 2011/0265872 A1* | 11/2011 | Gustafson | ............ | H01L 31/0543 136/259 |
| 2012/0048341 A1* | 3/2012 | Mikhael | ............ | F24J 2/38 136/246 |
| 2012/0143383 A1* | 6/2012 | Cooperrider | ............ | H04Q 9/00 700/295 |
| 2012/0147604 A1* | 6/2012 | Farmer | ............ | H05B 37/0254 362/249.03 |
| 2013/0000632 A1* | 1/2013 | Lundahl | ............ | H02S 20/00 126/574 |
| 2013/0015805 A1* | 1/2013 | Teggatz | ............ | H02J 7/0016 320/101 |

\* cited by examiner

DISTRIBUTED STREET LIGHTS MONITORING, COMMAND AND CONTROL COMBINED WITH SOLAR PHOTO VOLTAIC CELL

CROSS-REFERENCE TO RELATED APPLICATIONS

The present application claims the benefit of U.S. Provisional Patent Application No. 61/716,659 entitled "DISTRIBUTED STREET LIGHTS ENERGY REMOTE MONITORING, COMMAND AND CONTROL COMBINED WITH SOLAR PV," filed on Oct. 22, 2012 and expressly incorporated herein, in its entirety, by reference.

BACKGROUND

Street lights, also referred to as lampposts, street lamps, light standards, or lamp standards, may be raised source of light on an edge of a road or a walkway. The street lights are switched on/off or lit at a certain time of the day. The street lights are switched on/off either using a switch or automatically using a photocell. The photocells are mounted usually on top of the street lights fixture. Monitoring and managing these street lights poses a challenge because of their sheer number and location.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
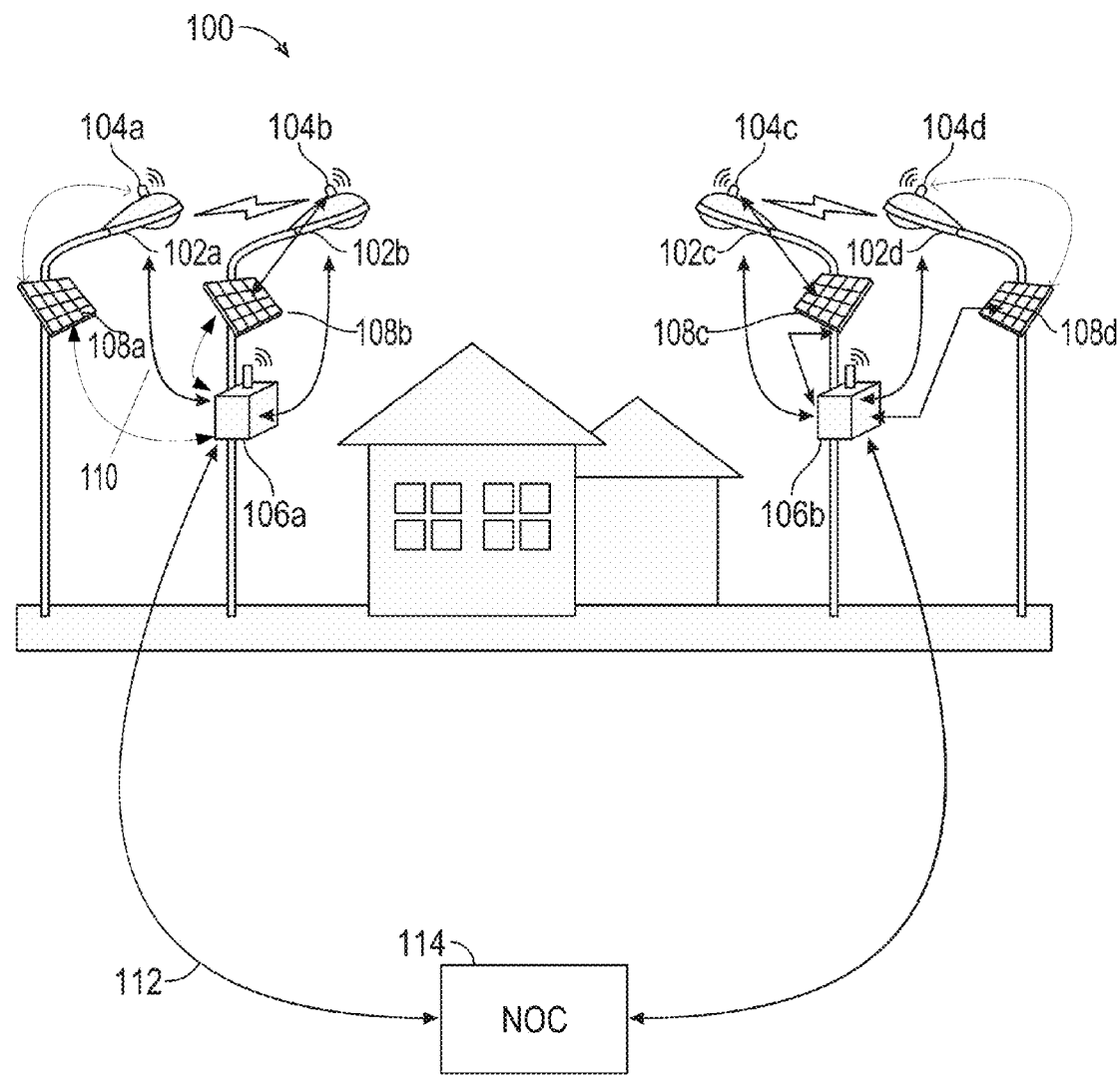
FIG. 1 is an operating environment.

Monitoring, control, and management of street lights may be provided. First, an amount of light may be determined. Next, a status of the street lights may be determined based on the determined amount of light. Then, a current status of the street lights may be determined. The current status may be compared with the determined status. Based on the comparison, the current status of the street light may be altered.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Street lights may be raised source of light on an edge of a road or a walkway. The street lights may be switched on/off either at a certain time of the day using a switch or automatically by using a dusk/dawn light photocell. For example, the dusk/down light photocell may switch on the street lights at dusk and switch them off at dawn. The street lights with no communication capabilities may be may be hard to control and manage from a central location. For example, the street lights with no communication capabilities may have to be calibrated individually with the respective light photocells. In another example, it may not be possible to monitor status of the street lights without communication capability from the central location.

Consistent with embodiments of the disclosure, methods and systems for monitoring, command, and control of street lights may be provided. For example, the disclosure may provide control of the street lights based on inputs from installed distributed photo voltaic (PV) cells. FIG. 1 illustrates a block diagram of a system 100 in which embodiments of the disclosure may be practiced. As shown in FIG. 1, system 100 may include a plurality of street lights 102a, 102b, 102c, and 102d (collectively referred to as street lights 102), a plurality of controllers 104a, 104b, 104c, and 104d (collectively referred at controllers 104), a plurality of access points 106a, 106b (collectively referred to as access points 106), a plurality of photo voltaic (PV) cells 108a, 108b, 108c, and 108d (collectively referred to as PV cells 108), and a network operation center (NOC) 114.

Each of street lights 102 may comprise a light emitting member mounted on a pole fixture. The light emitting member may comprise, but not limited to, a light emitting diode (LED) lamp, a high pressure sodium (HPS) lamp, a high intensity discharge (HID) lamp, and an induction lamp. The light emitting member of street lights 102 may be controlled by controllers 104. For example, the light emitting member of street light 102a may be controlled by controller 104a. Controllers 104 may be an intelligent controller, and may be installed on top or bottom of street lights 102 pole fixtures. Controllers 104 may be mounted in different ways including, for example twist lock install, threaded nipple bolt-in or via providing 3-5-prong retrofit install.

Each of controllers 104 may communicate with at least one of access points 106. For example, each of controllers 104 may communicate with the nearest access point either directly or hoping through another controller. As shown in FIG. 1, controllers 104a and 104b may communicate with access point 106a while controllers 104c and 104d may communicate with access point 106b. Controllers 104 may communicate with access points 106 through a network 110. Network 110 may be a Zigbee, a WIFI, power-line communications, an EDGE network, a third generation (3G) network, a fourth generation (4G) network, a fiber network or any other reliable communication standard or protocol.

Each of access points 106 may communicate with NOC 114. For example, access point 106a and access point 106b may communicate with NOC 114 through network 112. Network 112 may be a Zigbee, a WIFI, power-line communications, an EDGE network, a third generation (3G) network, a fourth generation (4G) network, a fiber network or any other reliable communication standard or protocol. In one embodiment, access points 106 may also communicate with PV cells 108. For example, access point 106a may communicate with PV cells 108a and 108b, and access point 106b may communicate with PV cells 108c and 108d.

PV cells 108 may be devices configured to generate electricity using light. For example, PV cells 108 may convert light into electricity using photovoltaic effect. PV cells 108 may be located on the pole fixtures of street lights 102. For example, each pole fixture for street lights 102 may support at least one PV cell. The electricity generated by PV cells 108 may be used locally (e.g. to power up street light 102) or may be fed to a power distribution system. PV cells 108 may be configured to communicate with controllers 104 and access points 106. For example, PV cell 108a may communicate with controller 104a and access point 106a. PV cells 108 may communicate the amount of energy generated to controllers 104 and access points 106. For example, PV cell 108a may be configured to communicate the amount of energy generated to controller 104a either directly or through access point 106a.

Figure 2:
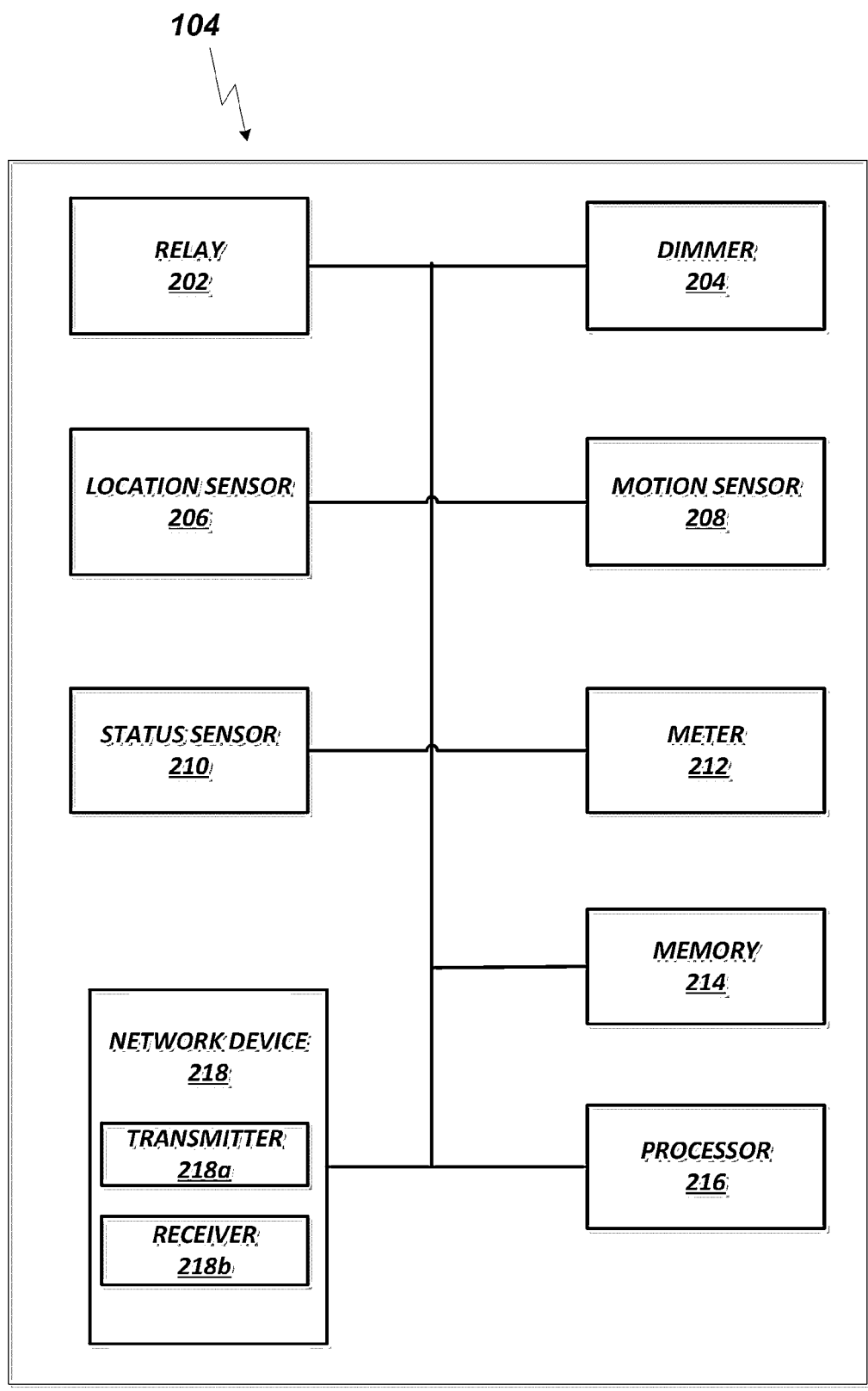
FIG. 2 is a block diagram of a street light controller.

FIG. 2 is a block diagram of controller 104a. Controller 104a may control a status of street light 102a. For example, controller 104a may switch on, switch off or dim street light 102a. Controller 104a may include a relay 202, a dimmer 204, a location sensor 206, a motion sensor 208, a status sensor 210, a metering device 212, a memory 214, a processor 216, and a network device 218. Relay 202 may be a device configured to switch on or switch off street light 102a. For example, relay 202 may be a switch. Dimmer 204 may be a device configured to adjust an amount of light being emitted by the light emitting member of street light 102a. Relay 202 and dimmer 204 may be compatible with different types of light emitting members, including: a light emitting diode (LED) lamp, a high pressure sodium (HPS) lamp, a high intensity discharge (HID) lamp, and an induction lamp for example.

Location sensor 206 may be configured to sense or store information regarding a physical location of street light 102a. For example, location sensor 206 may provide information regarding physical coordinates or a street address of the location of street light 102a. The location information may be used to identify the nearest access point (e.g. access point 106a) and PV cell (e.g., PV cell 108a) for street light 102a. In addition, the location information may further be used by access point 106a when sending commands or scheduling any maintenance at street light 102a. The location information may be stored in memory 214 or a memory associated with location sensor 206 at a time of installation of street light 102a.

Motion sensor 208 may sense movement around street light 102a. For example, motion sensor 208 may be configured to sense movement of a pedestrian or a vehicle near street light 102a. Based on output from motion sensor 208, commands may be generated for relay 202 or dimmer 204. For example, if motion sensor 208 detects movement of a pedestrian around street light 102a, a command may be generated for relay 202 to switch on street light 102a. In another example, if motion sensor 208 does not detect any movement for a predetermined amount of time, a command may be generated for relay 202 to switch off street light 102a, or for dimmer 204 to decrease intensity of street light 102a.

Status sensor 210 may be configured to monitor a status of street light 102a. For example, status sensor 210 may be configured to monitor street light 102a is currently switch on or off, and if the light emitting member of street light 102a is working properly. As another example, status sensor 210 may monitor if motion sensor 208 is working properly. Status sensor 210 may further be configured to generate a message or an alarm based on a detection of any abnormality in working of street light 102a or any part of controller 104a. The message/alarm generated by status sensor 210 may be sent to access point 106a and subsequently relayed to NOC 114. The message/alarm may be monitored by access point 106a or NOC 114, and subsequently may be reported for scheduling maintenance.

Metering device 212 may measure an amount of energy consumed by street light 102a. For example, metering device 212 may measure the amount of energy consumed by street light 102a. Metering device 212 may further store the measured amount of energy consumed by street light 102a in memory 214. The energy consumption data for street light 102a may be stored in memory 214 with a timestamp and a unique identifier identifying street light 102a. The energy consumption data stored in memory 214 may be transmitted to access point 106a and subsequently to NOC 114 on a periodic basis.

Memory 214 may be used by various sensors described above to store the sensed local variables. For example, the sensed local variables from location sensor 206, motion sensor 208, status sensor 210, and metering device 212 may be stored in memory 214. The sensed local variables from each sensors of controller 104a may be stored along with an identifier identifying the sensor, identifying street light 102a, and a timestamp. The sensed local variables stored in memory 214 may be relayed to NOC 114 via access point 106a. The sensed local variables may be used by processor 216 to generate commands locally for street light 102a. For example, processor 216 may generate command for relay 202 to switch on street light 102a when motion sensor 208 detects movement of a pedestrian. These local commands may be generated based on a lighting policy stored in memory 214.

In one embodiment, memory 214 may include a first lookup table for determining an amount of natural light corresponding to an amount of energy generated by PV cell 108a. The first lookup table may comprise a mapping of a plurality of energy generation bands and corresponding amount of natural light. Memory 214 may further include a second lookup table for determining a desired status of street light 102a corresponding the determined amount of natural light. The second lookup table may comprise a mapping of the amount of natural light and a desired status corresponding to the amount of natural light for street light 102a. The first lookup table and the second lookup table may be provided and updated by NOC 114 periodically. For example, the first and the second lookup tables may be updated based on a seasons of the year. In one embodiment, the first lookup table and the second lookup table may be provided as a single lookup table.

Processor 216 may be configured to generate commands to relay 202 or dimmer 204 based on the lighting policy and local variables such as a local time or the amount of natural light. For example, processor 216 may be configured to generate commands to switch on street light 102a at a predetermined time every day. Similarly processor 216 may be configured to generate commands to switch off street light at a predetermined time every day. Processor 216 may be further configured to override commands received from access point 106a based on change of local variables. For example, processor 216 may be configured to switch on/off street light 102a when there is change in the natural light at street light 102a.

In one embodiment, processor 216 may determine the amount of natural light based on the amount of energy generated by PV cell 108a. For example, processor 216 may receive the amount of energy generated by PV cell 108a periodically and perform a lookup operation in the first lookup table to determine a corresponding amount of natural light. Based on the determined amount of light, processor 216 may further determine a desirable status for street light 102a. The desirable status of street light 102a may be determined by performing a lookup operation in the second lookup table. For example, processor 216 may determine that the amount of natural light is below a predetermined limit and street light 102a should be switch on. Similarly, processor 216 may determine that the amount of natural light is above a predetermined limit and street light 102a should be switched off.

Processor 216 may further determine a current status of street light 102a. Processor 216 may compare the current status with the desired status. Based on the comparison, processor 216 may generate commands to change the current status of street light 102a. For example, if the current status is different from the desired status, processor 216 may generate commands to relay 202 to change the current status of street light 102a. Based on the comparison, processor 216 may generate commands to switch on street light 102a, switch off street light 102a, or dim street light 102a. For example, if the desired status for street light 102a is on, and the current status of street light 102a is switched off, processor 216 may generate a command to relay 202 to switch on street light 102a.

Network device 218 may receive commands from and send data to access points 106a and PV cell 108a. Network device 218 may include a transmitter 218a and a receiver 218b. Transmitter 218a may send data, such as energy consumption data and status data, over communication network 110 to access point 106a. Transmitter 218a may further send energy consumption data and status information, corresponding to street light 102a, to access point 106a either directly or hoping through another street light (e.g. street light 102b). Receiver 218b may receive commands and the lighting policy from access point 106a via communication network 110. Receiver 218b may further receive data sent by another street light 102b via communication network 110. Receiver 218b may further receive the energy generation data from PV cell 108a.

Controller 104a may further include a time sensor (not shown). Time sensor may sense a current time at the location of street lights 102. The current time information provided by the time sensor may be used by processor 216 to perform scheduled switching on and switching off of street light 102a.

Figure 3:
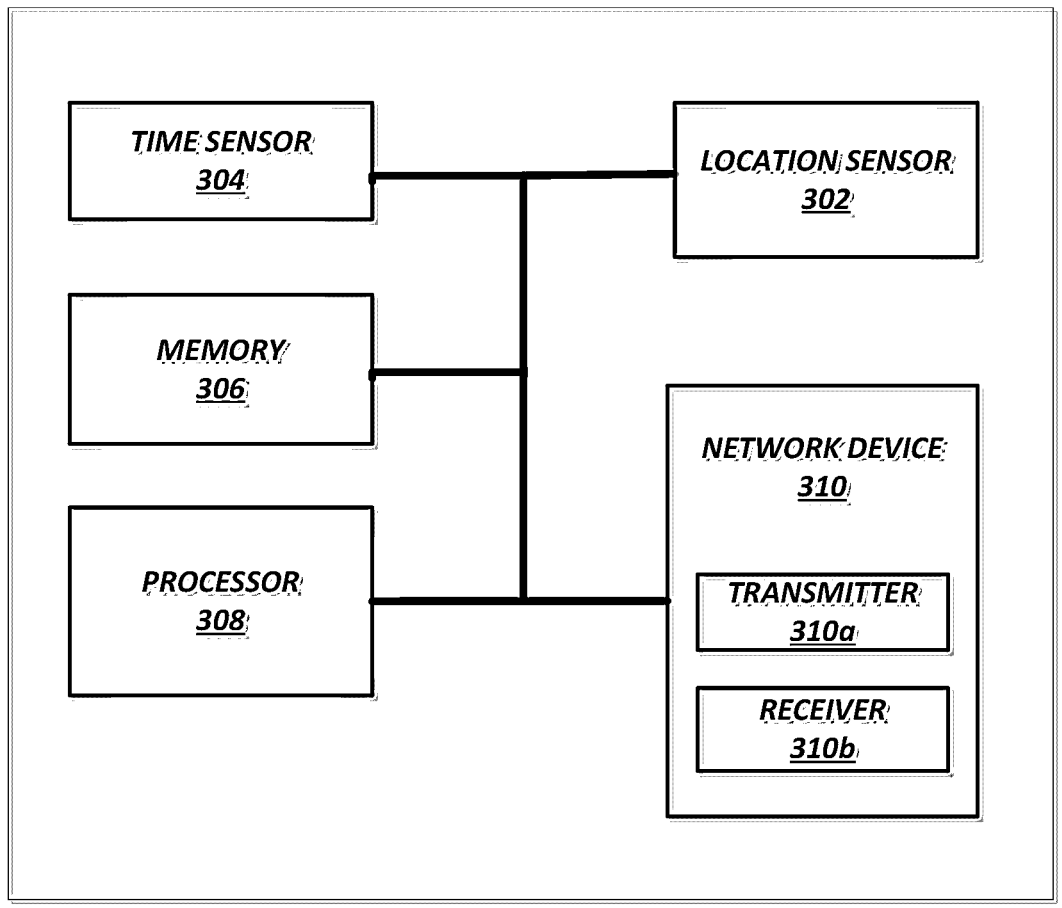
FIG. 3 is a block diagram of an aggregator.

FIG. 3 is a block diagram of access point 106a. Access point 106a may be configured to monitor and report on operation and health of street lights 102a and 102b and PV cells 108a and 108b. For example, access point 106a may accumulate amount of energy consumed by street lights 102a and 102b, amount of energy generated by PV cells 108a and 108b, and the status of street lights 102a and 102b. In addition, access point 106a may accumulate the amount of energy generated by PV cells 108a and 108b. Access point 106a may relay the accumulated amount of energy generated, amount of energy consumed, and repair alerts to NOC 114.

As shown in FIG. 3, access point 106a may include a location sensor 302, a time sensor 304, a memory 306, a processor 308, and a network device 310. Location sensor 302 may be to sense and store data regarding physical location of access point 106a. For example, location sensor 302 may provide data regarding physical coordinates or street address of the location of access point 106a. The location data may be used by NOC 114 to identify the nearest access point 106a for street light 102a and 102b, and PV cells 108a and 108b. For example, the location data may be used by NOC 114 for sending commands or lighting policy for street lights 102a and 102b based on the energy generation data received from PV cells 108a and 108b.

Time sensor 304 may provide timing information at the location of access point 106a. For example, time sensor 304 may track a current time at the location of access point 106a. The timing information provided by time sensor 304 may be used by processor 308 in performing scheduled switching on and switching off of street lights 102a and 102b.

Memory 306 may be configured to store various data received at access point 106a. For example, memory 306 may store energy consumption data received from controllers 104a and 104b as well as the energy generation data received from PV cells 108a and 108b. As another example, memory 306 may store lighting schedule received from NOC 114.

Processor 308 may be configured to generate commands for street lights 102a and 102b and forward the commands generated by NOC 114 to controllers 104a and 104b. For example, processor 308 may generate commands for street lights 102a and 102b based on the amount of energy generated by PV cells 108a and 108b, and a lighting policy stored in memory 306. Based on the amount of energy generated, processor 308 may generate command to switch on street lights 102a and 102b. In addition, processor 308 may generate command based on a current time and the lighting policy. For example, processor 308 may, based on current time and a dusk-to-dawn lighting policy, generate commands to switch on street lights 102a and 102b.

Commands generated by processor 308 may be communicated to controllers 104a and 104b via network device 310. Network device 310 may include a transmitter 310a and a receiver 310b. Transmitter 310a may send the commands generated by processor 308 over communication network 110. In addition, transmitter 310a may forward various data, such as data received from controllers 104a and 104b, data received from PV cells 108a and 108b, alerts received from controllers 104a and 104b, and data stored in memory 306, to NOC 114 via communication network 112. Receiver 310b may receive data from NOC 114 over communication network 112. In addition, receiver 310b may receive data sent by controllers 104a and 104b and PV cells 108a and 108b over communication network 110.

Figure 4:
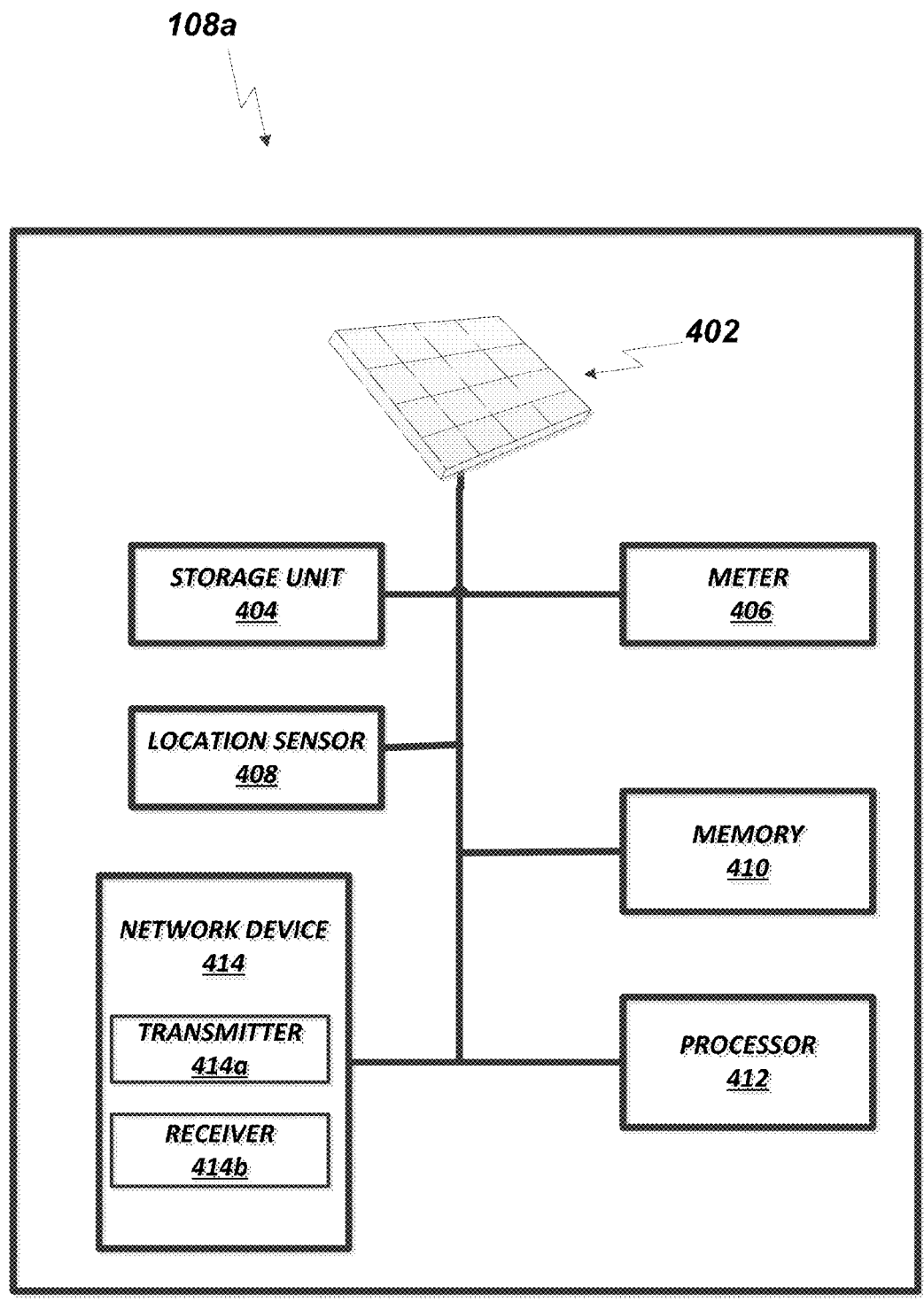
FIG. 4 is a block diagram of a photo voltaic (PV) cell.

FIG. 4 is a block diagram of PV cell 108a. PV cell 108a may generate power from sunlight. For example, PV cell 108a may convert solar energy from sunlight and store it in an energy storage unit associated with it. The stored energy may be used to power street light 102a. Although PV cell 108a is shown to be mounted on the pole fixture of street light 102a, it may be apparent to a person with ordinary skill in the art that PV cell 108a may be mounted on a separate pole fixture. In addition, FIG. 100 is shown to include equal number of PV cells 108 and street lights 102, it may be apparent to a person with ordinary skill in the art that system 100 may include fewer number of PV cells 108 or street lights 102.

As shown in FIG. 4, PV cell 108a may include a solar panel 402, a storage unit 404, a meter 406, a location sensor 408, a memory 410, a processor 412, and a network device 414. Solar panel 402 may be an electrical device that converts energy of light into electricity by photovoltaic effect. For example, solar panel 402 may generate electricity when exposed to light. The electricity generated by solar panel 402 may vary according to an amount and intensity of exposure to the light. The electricity generated by solar panel 402 may be stored in storage unit 404. For example, storage unit 404 may be a battery. The electricity stored in storage unit 404 may be used to power street light 102a. For example, street light 102a may be connected to and powered by storage unit 404. In one embodiment, solar panel 402 may directly be connected to street light 102a bypassing storage unit 404. In another embodiment, storage unit 404 and solar panel 402 may be connected to a power distribution system, feeding the generated electricity into the power distribution system through a power converter.

Meter 406 may measure the amount of electricity (also referred to as energy) generated by solar panel 402. Meter 406 may further measure an amount of energy stored in storage unit 404. The energy generation data for solar panel 402 may be stored in memory 410 with a timestamp and a unique identifier identifying solar panel 402. The energy generation data and the amount of energy stored in storage unit 404 may be transmitted to controller 104a, access point 106a, and subsequently to NOC 114 on a periodic basis. For example, processor 412 may be configured to send the energy generation data through network device 414.

Location sensor 408 may sense and store data regarding physical location of PV cell 108a. For example, location sensor 408 may provide data regarding physical coordinates or street address of the location of PV cell 108a. The location data may be used by NOC 114 to identify the nearest access point 106a and street light 102a. For example, the location data may be used by NOC 114 for sending commands or lighting policy for street light 102a.

Network device 414 may include a transmitter 414a and a receiver 414b. Transmitter 414a may send the energy generation data over a communication network. For example, transmitter 414a may send the energy generation data over a power line communication network. Receiver 414b may be configured to receive commands from NOC 114 over the communication network. Although PV cell 108a is shown to include its own network device 414, it may be apparent to a person with ordinary skill in the art that PV cell 108a may use network device 218 of controller 104a or network device 310 of access point 106a.

Figure 5:
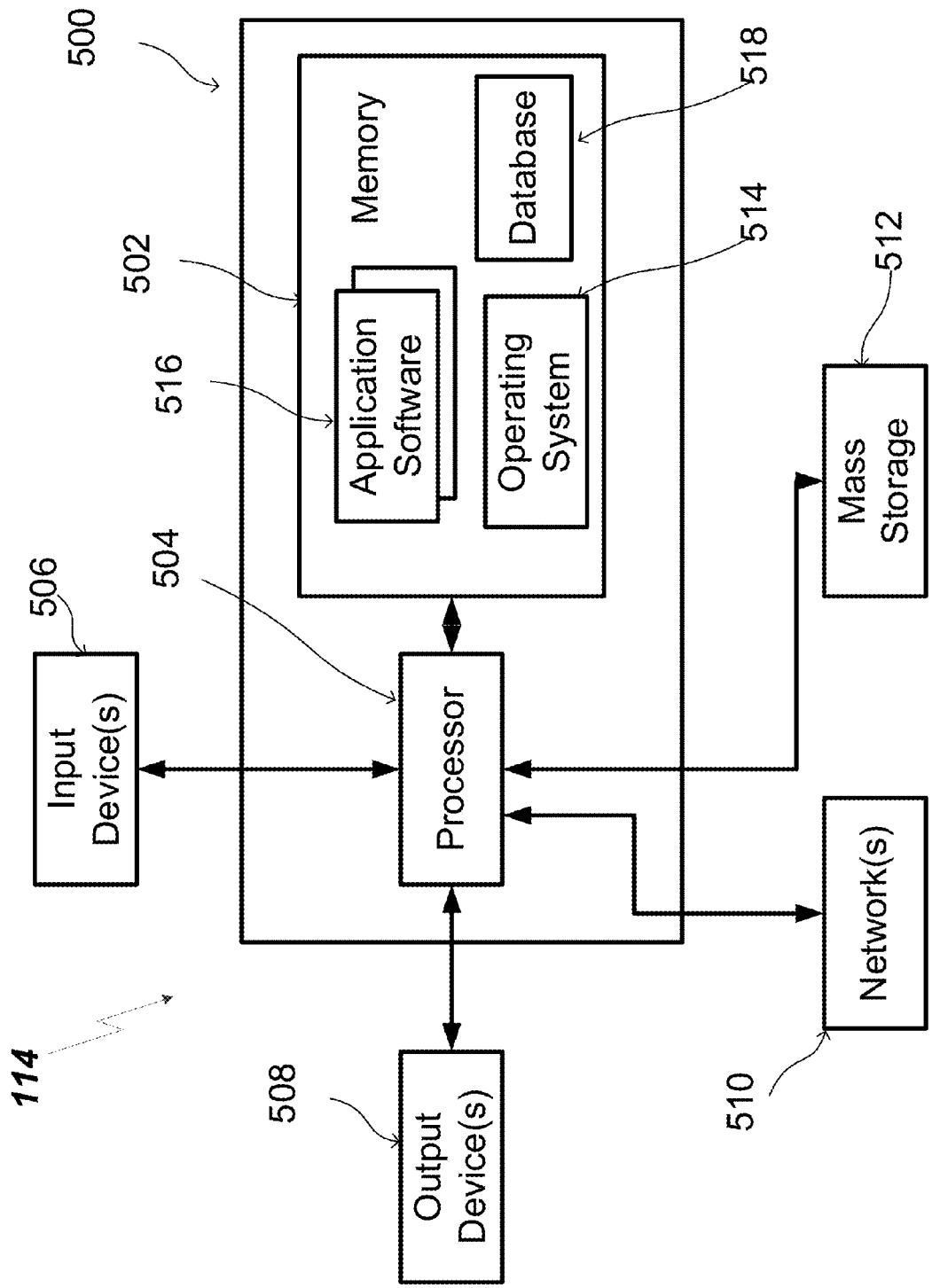
FIG. 5 is a block diagram of a network operation center.

FIG. 5 is a block diagram of NOC 114. NOC 114 may be a computer system configured to monitor, control, and manage street lights 102. As shown in FIG. 5, NOC 114 may include at least one processor 504 coupled to a memory 502. Processor 504 may represent one or more processors (e.g., microprocessors), and memory 502 may represent random access memory (RAM) devices comprising a main storage of NOC 114, as well as any supplemental levels of memory e.g., cache memories, non-volatile or back-up memories (e.g. Programmable or flash memories), read-only memories, etc. In addition, memory 502 may be considered to include memory storage physically located elsewhere in NOC 114, e.g. any cache memory in processor 504 as well as any storage capacity used as a virtual memory, e.g., as stored on a mass storage device 512.

NOC 114 may be configured to receive a number of inputs and generate a number of outputs for communicating information externally. For example, NOC 114 may be configured to receive inputs from access point 106, PV cells 108, and an operator. For interface with the user or the operator, NOC 114 may include one or more user input devices 506 (e.g., a keyboard, a mouse, imaging device, etc.), and one or more output devices 508 (e.g., a liquid crystal display (LCD) panel, a sound playback device (speaker, etc.))

For additional storage, NOC 114 may also include one or more mass storage devices 512, e.g., a floppy or other removable disk drive, a hard disk drive, a direct access storage device (DASD), an optical drive (e.g. a compact disk (CD) drive, a digital versatile disk (DVD) drive, etc.), and a tape drive, among others. Furthermore, NOC 114 may include an interface with one or more networks 510 (e.g., a local area network (LAN), a wide area network (WAN), a wireless network, and/or the internet among others) to permit the communication of information with other computers coupled to the networks. NOC 114 may include suitable analog and/or digital interfaces between processor 504 and each of the components 502, 506, 508, and 510.

NOC 114 may operate under the control of an operating system 514, and execute various computer software applications, components, programs, objects, modules, etc. to implement the techniques described in this description. Moreover, various applications, components, programs, objects, etc., collectively indicated by reference 516, may also execute on one or more processors in another computer coupled to NOC 114 via a network 510, e.g. in a distributed computing environment, whereby the processing required to implement the functions of a computer program may be allocated to multiple computers over a network. Application software 516 may include a set of instructions which, when executed by processor 504, may cause NOC 114 to manage street lights 102 as described. NOC 114 may also include a database 518. Database 518 may be used to store the energy consumption data received for street lights 102 and the energy generation data from PV cells 108. Database 518 may further include various commands and controls for street lights 102.

In one embodiment, NOC 114 may provide a web based interface, or an energy management platform, for managing street lights 102. For example, the web based interface may provide an interface for a user to determine and create the lighting policy for street lights 102. The lighting policy may determine different devices' functionalities, i.e. ON/OFF or dimming features. For example, the lighting policy may include a dusk to dawn lighting schedule. The lighting schedules may be defined for various periodicities i.e. daily, monthly, seasonal, and a onetime event. The web base interface may further provide an adaptive control via the amount of light, motion, traffic patterns to dim, switch on or switch off street lights 102 based on specified conditions.

In another embodiment, NOC 114 may be configured to monitor and manage street lights 102 and PV cells 108. For example, based on the status data received from status sensor 210 may schedule a maintenance of street light 102a. The maintenance schedule may include the location of street light 102a, name and details of an affected element of street light 102a, and type of maintenance needed for the affected element. In addition, the maintenance schedule may include additional information such as whether the affected element needs to be replaced. Furthermore, NOC 114 may provide an audit on the amount of energy consumed by street lights 102 and the amount of energy generated by PV cells 108. For example, NOC 114 may provide statistical analysis of the amount of energy consumed by street lights 102.

Although the NOC 114 is shown to include a single computer system, it may be apparent to those skilled in the art that NOC 114 may be a distributed computing system with multiple processors and memory devices or a cloud computing system. Processor 504 of NOC 114 may be configured to execute a method for managing distributed energy resources. An example flow diagram of a method of managing street lights 102 is illustrated in FIG. 6.

Figure 6:
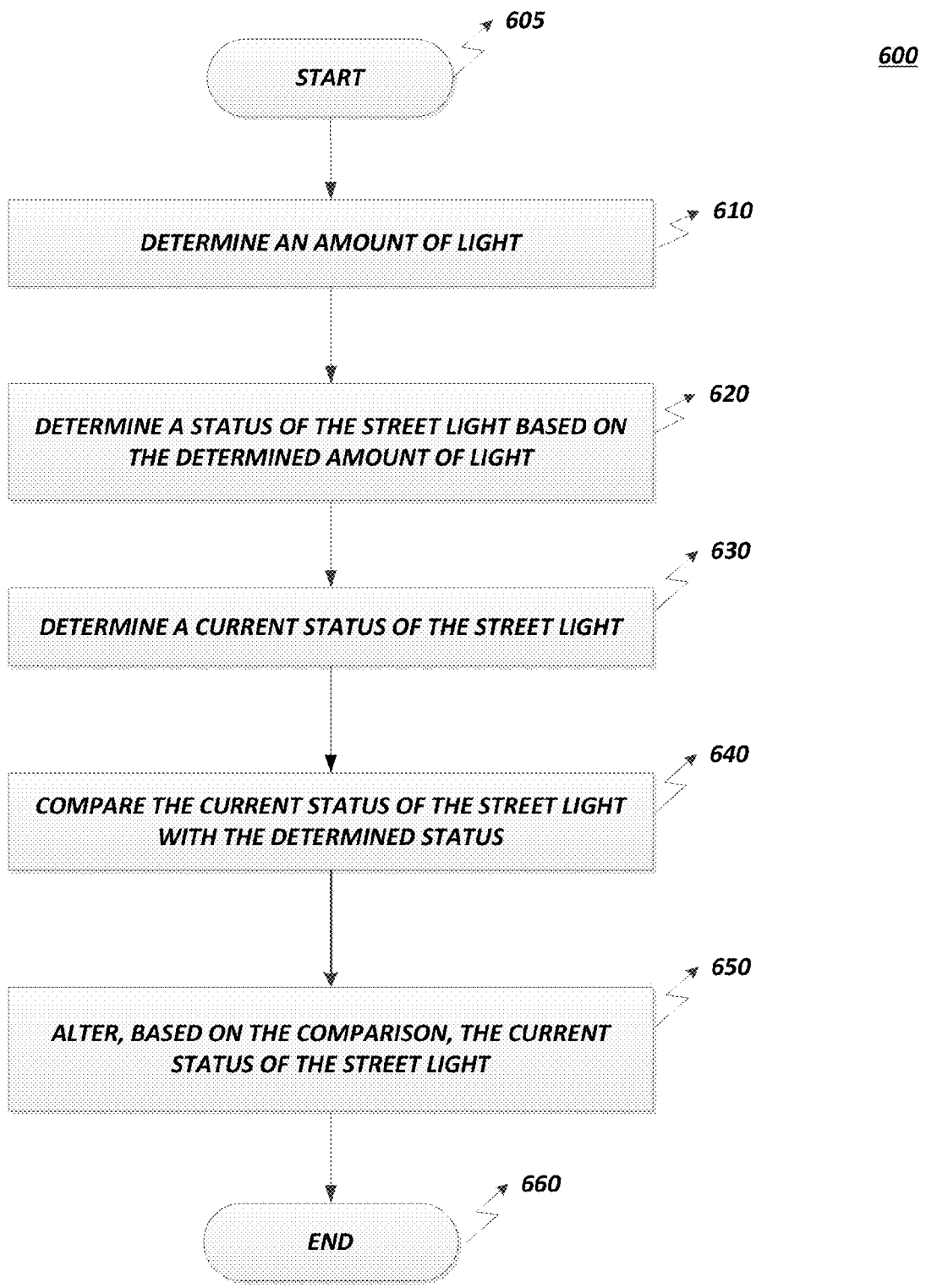
FIG. 6 is a flow diagram of a method for managing street lights.

FIG. 6 is a flow chart setting forth the general stages involved in a method 600 consistent with embodiments of the disclosure for control, management, and monitoring for distributed street lights 102. Method 600 may be implemented using any one of controllers 104, access points 106, and NOC 114. For example, method 600 may be stored in form of instruction in memory 214, memory 306, and memory 502. These stored instructions may be executed by processor 216, processor 308, and processor 504 respectively to implement method 600. Ways to implement method 600 will be described in greater detail below.

As shown in FIG. 6, method 600 may begin at starting block 605 and proceed to stage 610 where an amount of light may be determined. For example, processor 216 may receive an amount of energy generated by PV cell 108a. Processor 216 may receive the amount of energy generated directly from PV cell 108a or from access point 106a. The amount of energy generated may be received on a periodic basis. In one embodiment, processor 216 may determine a moving average of the received amount of energy generated. The moving average may be determined over a predetermined time period. The determination of the moving average may eliminate fluctuations caused by short period of cloud cover over PV cells 108. After receiving the amount of energy generated, processor 216 may determine the amount of light. For example, processor 216 may perform a lookup operation in the first lookup table to determine the amount of light.

Form stage 610, where processor 216 determines the amount of light, method 600 may advance to stage 620 where processor 216 may determine a desired status for street light 102a based on the determined amount of light. For example, if the determined amount of light is below a predetermined level, processor 216 may determine that street light 102a should be switched on. Similarly, if the determined amount of light is above a predetermined level, processor 216 may determine that street light 102a should be switched off. The desired state of street light 102a may be determined based on a lightening policy. For example, the light policy may include the second lookup table comprising a mapping of the amount of light and a status of street light 102a for the amount of light. As another example, the lighting policy may include a dusk to dawn lighting schedule. The lighting policy may be created and configured by an operator.

From stage 620, where processor 216 determines the desired status of street lights 102, method 600 may advance to stage 630 where a current status of street light 102a may be determined. For example, processor 216 may determine the current status of street light 102a based on the status report received from status sensor 210. The current status may include switched on, switched off, or dim.

After processor 216 determines the current status of street light 102a at stage 630, method 600 may advance to stage 640 where processor 216 may compare the current status with the desired status. Once, processor 216 has compared the current status with the determined status at stage 640, method 600 may advance to stage 650 where processor 216 may alter the current status of street light 102a based on the comparison. For example, if the current status of street light 102a is switched off and the desired status is switched on, processor 216 may generate commands to change the current status of street light 102a. The generated command may be sent to relay 202. Relay 202, based on the command received from processor 216, may alter the current status of street light 102a. After relay 202 has altered the current status of street lights 102, method 600 may end at stage 660.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining an amount of light, wherein determining the amount of light comprises:
   determining an amount of energy generated by a solar panel over a period of time, the solar panel located in proximity to a street light and configured to supply energy to the street light; and
   determining the amount of light based on the amount of energy generated by the solar panel;
   determining a status of the street light based on the determined amount of light;
   determining a current status of the street light;
   comparing the current status with the determined status; and
   altering, based on the comparison, the current status of the street light.

2. The method of claim 1, wherein determining the amount of light based on the amount of energy generated by the solar panel comprises:
   receiving a mapping table of the amount of energy generated and the amount of light; and
   performing a lookup operation in the mapping table to determine the amount of light.

3. The method of claim 1, wherein determining the amount of energy generated comprises determining the amount of energy generated from the solar panel wherein the solar panel is mounted on the street light.

4. The method of claim 1, wherein determining the status of the street light based on the determined amount of light comprises determining the status of the street light based on the determined amount of light and a lighting policy wherein the lightening policy comprises a mapping of the amount of light and the status of the street light corresponding to the amount of light.

5. The method of claim 1, wherein determining the status of the street light based on the determined amount of light comprises determining the status of the street light based on the determined amount of light and a lighting policy wherein the lightening policy comprises dusk to down schedule.

6. A system comprising:
   a street light, and
   a controller connected to the street light, wherein the controller is configured to:
   determine an amount of light wherein the controller being configured to determine the amount of light comprises the controller being configured to;
   determine an amount of energy generated by a solar panel located in proximity to the street light and configured to supply energy to the street light;
   perform a lookup operation in a first table comprising a mapping of the amount of energy and the amount of light, and
   determine the amount of light based on the lookup operation;
   determine a status of the street light based on the determined amount of light;
   determine a current status of the street light;
   compare the current status and the determined status; and
   alter, based on the comparison, the current status of the street light.

7. The system of claim 6, wherein the controller is further configured to receive the first table from a network operation center.

8. The system of claim 7, wherein the controller is configured to receive the first table from the network operation center from a smart grid communication interface.

9. The system of claim 6, wherein the determined amount of energy generated by the solar panel comprises a moving average of the amount of energy generated by the solar panel.

10. The system of claim 6, wherein determining the status of the street light based on the determined amount of light comprises:
    receiving a second table comprising a mapping of the amount of light and the status of the street light corresponding to the amount of light; and
    performing a lookup operation in the second table to determine the status of the street light.

11. The system of claim 10, wherein the second table is received as a lightning from a network operation center.

12. A system comprising:
    a network operation system configured to manage a plurality of street lights, the network operation center comprising a memory and a processor, wherein the memory comprises instructions which when executed by the processor cause the network operation center to:
    determine an amount of light associated with a predetermined geographical area, wherein determining the amount of light associated with the predetermined geographical area comprises:
    determining an amount of energy generated from at least one solar panel over a period of time, the at least one solar panel located in the predetermined geographical area, the at least one solar panel configured to supply energy to a one of the plurality of street lights, and
    determining the amount of light based on the received amount of energy generated;
    determine a status of the plurality of street lights in the predetermined geographical area based on the determined amount of light; and
    generate commands to change the current status of each of the plurality of street lights to the determined status.

13. The system of claim 12, wherein the instructions which when executed by the processor further cause the network operation center to:
    determine at least one access point located in the predetermined geographical area; and
    send the generated commands to the at least one access point.

14. The system of claim 13, wherein the at least one access point is configured to forward the generated commands to a plurality of controllers wherein each of the plurality of controllers are configured to a control the current status of the one of the plurality of street lights.

15. The system of claim 14, wherein each of the plurality of controllers are further configured to:
    compare the current status of the one of the plurality of street lights; and
    change the current status to the determined status based on the comparison.

* * * * *